United States Patent
Anderson et al.

[11] Patent Number: 5,938,302
[45] Date of Patent: Aug. 17, 1999

[54] MULTIPLE ENCLOSURES AND METHOD

[75] Inventors: Thomas E. Anderson, South Barrington; Glen A. Stelzer, Schaumburg; Jerry L. Young, Lockport, all of Ill.

[73] Assignee: Amco Engineering Co., Schiller Park, Ill.

[21] Appl. No.: 09/092,730

[22] Filed: Jun. 5, 1998

Related U.S. Application Data

[63] Continuation-in-part of application No. 08/532,271, Sep. 22, 1995, Pat. No. 5,639,150, is a division of application No. 08/719,899, Sep. 25, 1996, Pat. No. 5,806,945.

[51] Int. Cl.⁶ .................................................. A47B 81/00
[52] U.S. Cl. ................................. 312/223.1; 312/265.1; 312/198; 312/265.3; 312/263
[58] Field of Search ....................... 312/198, 199, 312/265.1, 265.4, 265.5, 265.3, 351, 223.1, 265.6; 108/107

[56] References Cited

U.S. PATENT DOCUMENTS

| | | | |
|---|---|---|---|
| 2,991,140 | 7/1961 | Anderson et al. | 312/257 |
| 3,034,844 | 1/1962 | Anderson et al. | 312/257 |
| 3,087,768 | 4/1963 | Anderson et al. | 312/263 |
| 3,265,419 | 8/1966 | Durnbaugh et al. | 312/265.1 X |
| 3,976,014 | 8/1976 | Brown | 312/198 X |
| 4,973,110 | 11/1990 | Nyquist | 312/265.2 X |
| 5,228,762 | 7/1993 | Mascrier | 312/265.4 |
| 5,250,752 | 10/1993 | Cutright | 312/265.4 X |
| 5,326,162 | 7/1994 | Bovermann | 312/265.3 |
| 5,333,950 | 8/1994 | Zachrai | 312/265.1 |
| 5,407,263 | 4/1995 | Jones et al. | 312/265.1 |
| 5,639,150 | 6/1997 | Anderson et al. | 312/265.3 |
| 5,713,651 | 2/1998 | Essig et al. | 312/265.4 |

Primary Examiner—Peter M. Cuomo
Assistant Examiner—Stephen Vu
Attorney, Agent, or Firm—Jack E. Dominik

[57] ABSTRACT

An electronic component enclosure system with main channel configurations which constitute the four corners and vertical support of a multiple enclosures. The channels are essentially a right angle with a vertex of the angle chamfered, or a right angle of two faces with means for joining the same at the corners, irrespective of whether the means are a sharp bend, a chamfer, and the like. The lateral faces of the channel terminate in recessed gutters. The gutters are essentially a J-shaped reverse bend in most instances. The mating channels are in such a side by side relationship that they require a relatively sharp bend at the right angle of the sections which, in turn, presents a flush surface appearance from the front, and which can be RFI shielded since the vertical channels are all essentially imperforate.

4 Claims, 3 Drawing Sheets

MULTIPLE ENCLOSURES AND METHOD

RELATED APPLICATIONS

The present Application is a Continuation-In-Part of application Ser. No. 08/532,271, filed Sep. 22, 1995; now issued as U.S. Pat. No. 5,639,150 on Jun. 17, 1997 and its Divisional Application Ser. No. 08/719,899, filed Sep. 25, 1996; now U.S. Pat. No. 5,806,945.

FIELD OF THE INVENTION

The present invention relates to electronic component enclosures which can be put together in multiples of two or more, side by side, which conform to various standards for size, strength, access, and permeability in the industry.

BACKGROUND OF THE INVENTION

The present invention is involved in the enclosing and housing of computer gear, communications gear, and other electronic equipment. Exemplary of the present invention are U.S. Pat. Nos. 2,991,140 and 3,034,844, both expired and both assigned to the assignee of this Application.

Of the subject patents, particularly U.S. Pat. No. 2,991,940, when developed, was the state of the art even at the time the Patent Application was filed. It did meet certain static strength requirements which were adequate at the time.

Since the development of U. S. Pat. Nos. 2,991,940; 3,034,844 and 3,087,768, however, a whole new industry of computers and communications gear have evolved. Some of these, if subjected to earthquake tremors or indeed an earthquake, can be substantially damaged. In addition, they are sensitive to spurious electro-type emissions. The subject of RFI shielding was in its infancy at the time of the development of the products of the subject three state of the then art patents.

In addition, including the various practical needs for such an enclosure, there are currently four requirements based upon national and international standards. They are the following:

1. Bell Core NEBS, which is a seismic test;
2. FCC primary RFI test;
3. NEMA test—NEMA certification capabilities, leakage, dust and contaminant penetration, and the like; and
4. IEC—These are certain international requirements which may or may not be included in the three foregoing requirements.

Severe earthquakes, in addition to destruction of homes, highways and office buildings, have resulted in the twisting and mangling of computers and related communications gear. Subsequent damage from after shocks have also been severe. Had the electronics been housed in a stronger housing, however, such damage could have been mitigated, if not inhibited or eliminated in some cases. Therefore, it is highly desirable to develop a modular enclosure which, because of its modularity, renders it relatively inexpensive to manufacture. Moreover, it is highly desirable to develop such a modular enclosure which is resistant to lateral loads, torsional loads, vibratory loads, and other severe conditions which may be anticipated from an earthquake or, indeed, from nearby exploding bombs where a military installation is involved. In addition, such a modular enclosure should lend itself to RFI shielding at least for primary purposes.

What is further needed, is a plurality of such cabinets which can be linked together, side by side, two or more, which afford the same or greater strength capabilities as well as conforming to the four standards set forth above.

SUMMARY OF THE INVENTION

The present invention evolves from the development of certain main channels configurations which constitute the four corners and vertical support of a multiple enclosures. The channels are essentially a right angle with a vertex of the angle chamfered, or a right angle of two faces with means for joining the same at the corners, irrespective of whether the means are a sharp bend, a chamfer, and the like. The lateral faces of the channel terminate in recessed gutters. The gutters are essentially a J-shaped reverse bend in most instances. Because the unit may fit together side by side, the mating channels in such side by side relationship require a relatively sharp bend at the right angle of the sections which, in turn, will present a flush surface appearance from the front, and which can be RFI shielded since the vertical channels are all essentially imperforate. The cross ties and ties from front to rear are similarly formed with an imperforate surface, and also with reversely folded lateral edges which define a gutter for the receipt of a mating member and suitable RFI materials. Desirably the cabinet is, as to each component, interiorly strengthened with unistrut support member. As in the parent U.S. Pat. No. 5,639,150, the joints are welded whenever possible, desirably with a seam weld, to add to the structural strength and eliminate seams through which RFI leakage cannot take place. The top closure terminates at its lower portion with an interiorly extending leg which is secured in RFI sealed relationship to the top cross ties from left to right and front to rear. When two such enclosures are to be joined together side by side, the adjacent vertical channels do not have a chamfered corner. This permits a flush mounting relationship. The same type of corner can be used on the outside corner, or the outside corners may be chamfered to add additional strength and enhance the appearance of the multiple units. When three or more such units are positioned side by side, the vertical channels with the exception of the outside left and outside right have right angles where the two faces meet. Optionally the exterior verticals can have a chamfered corner, or they also can be a straight right angle. The top closure is modified for multiples in order to span the entire top. Where necessary, the top can be sectioned, but desirably that is avoided since it provides one more seam which requires sealing against RFI leakage. The corner gussets are provided to nestingly engage the legs of the cross ties, both front and rear. Desirably all of the corner gussets are of the same construction. The method of the invention looks to the formation of multiple panels with the appearance of a single top cover by utilizing a single top closure.

In view of the foregoing it is a principle object of the present invention to translate the integrity of the product basically as disclosed in U.S. Pat. No. 5,639,150 into two or more related adjacently spaced such enclosures to the end that even as many as six can be secured side by side, in which all six exhibit the structural and performance requirements of one.

A further object of the present invention is to permit the positioning of such enclosures in a side by side relationship in which they are tied together by the top closure.

Yet another object of the present invention is to provide such enclosures with means for securing the same together as well as covering on the top by individual elements being shipped, and assembled by the manufacturer who normally inserts the electronic components.

A further object of the present invention is to achieve the foregoing objectives in a structure which is cost effective.

DESCRIPTION OF ILLUSTRATIVE DRAWINGS

Further objects and advantages of the present invention will become apparent as the following description of an illustrative embodiment proceeds, taken in conjunction with the accompanying drawings, in which.

DESCRIPTION OF ILLUSTRATIVE EMBODIMENTS

Figure 1:
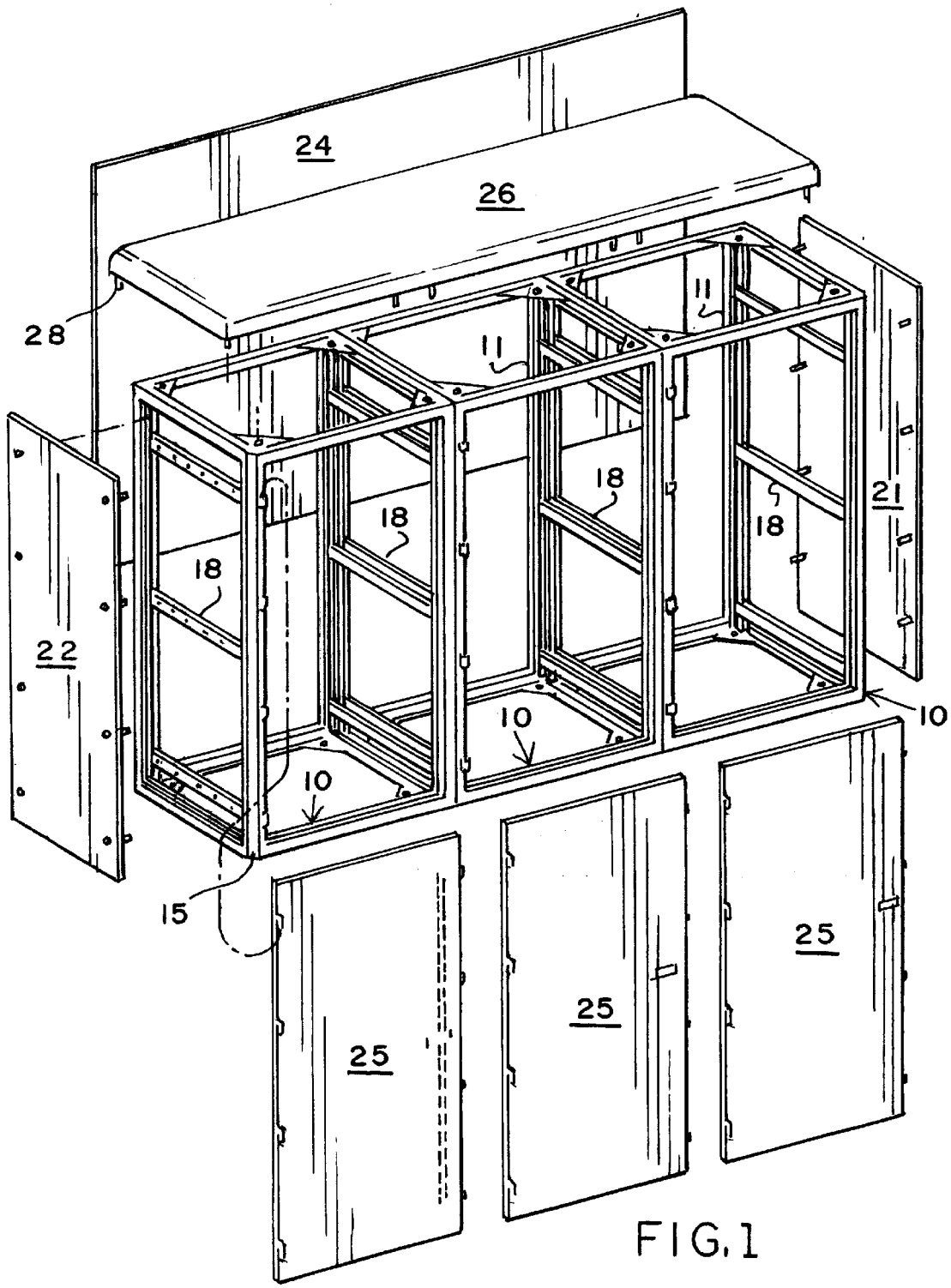
FIG. 1 is a partially exploded view of three separate enclosure units joined in exemplary fashion of the present invention.

Proceeding with FIG. 1, and bearing in mind that recently issued U.S. Pat. No. 5,639,150 shows an exemplary individual enclosure frame 11, it will be seen that a plurality of such frames 11, as shown in FIG. 1, can be put together. The showing in FIG. 1 is of three such enclosures 10. In addition, the top 26 covers the entire upper portion and is secured by top mount bolts 28 to the entire upper portion of the three enclosures as secured together. At this point it should be remembered that two enclosures 10 may be secured together, or there may be multiples of three or more, depending upon the application.

The enclosure frame 11, as shown in FIG. 1, requires a plurality of front panels 25 (or doors), two side panels 22, and a top closure 26. The top closure 26 is provided with reversely folded lateral edges which, in turn, have dependent reversely folded under portions at which four corner bolt (or four for each enclosure 10) extend downwardly and are secured to the enclosure 10. This securement is readily undertaken along with an RFI shielding material so that RFI shielding take place over the entire top of the frame 11 irrespective of how many enclosures 10 are involved, and therefore RFI leakage over the top, whether there is one enclosure 10, two enclosures 10, three enclosures 10 as shown, or a multitude thereof The two end panels 22 are secured over the gutters of the main channel as well as the doors 25 and rear panels 24.

Figure 2:
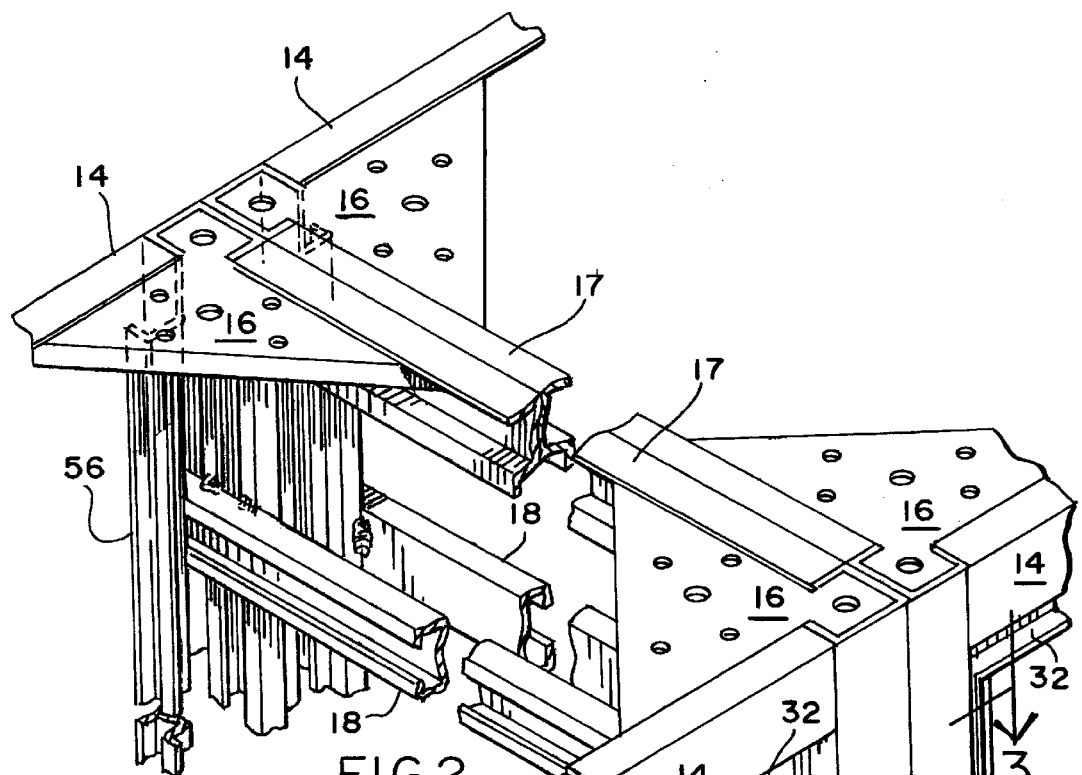
FIG. 2 is a perspective exploded view, partially broken, of the main frames being secured together by means of securing the main channel to each other.
Figure 3:
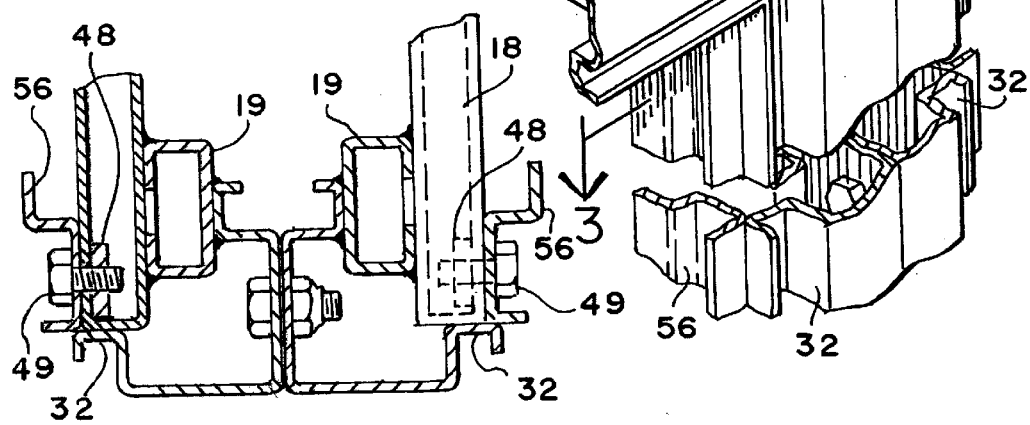
FIG. 3 is an enlarged transverse sectional view taken along section line 3—3 of FIG. 2 showing the two adjacent main channels and the related uni-struts.

More specifically, as will be seen in FIGS. 2 and 3, gutters 32 frame each and every opening of each enclosure 10. In this manner, the side panels 22, lateral mounting panels 21, and doors 25, are all RFI shielded when in the closed configuration with RFI shielding 54 in the gutters.

The means for joining the adjacent enclosures 10 together, as well as the interior support, are shown in perspective in FIG. 2. There will be seen that the top four corners all have gussets 16. The side cross ties 17 and the front and rear cross ties 14 are secured to the main channel 12, with the gussets 16 nested in the right angle corner.

Completing the unit are vertical uni-struts 19 which are welded or otherwise permanently secured on their back side to the reverse portion of the interior gutter 32 of the main channel 12. Then the horizontal uni-strut 18 is similarly secured to the vertical uni-strut 19. Particularly as noted in FIG. 3, it will be seen that a uni-strut large blocking bolt 48 is capable of sliding forwardly and rearwardly on the horizontal uni-strut 18. The threaded shaft and opposite uni-strut nuts 49 secure movable members adjustably in place on the vertical uni-strut 19 and the horizontal uni-strut 18. As shown in FIG. 3, an enclosure joiner bolt 20 secures any two adjacent enclosures together. Normally an RFI shielding strip is applied between the two adjacent faces of the adjacent main channels 12.

Figure 4:
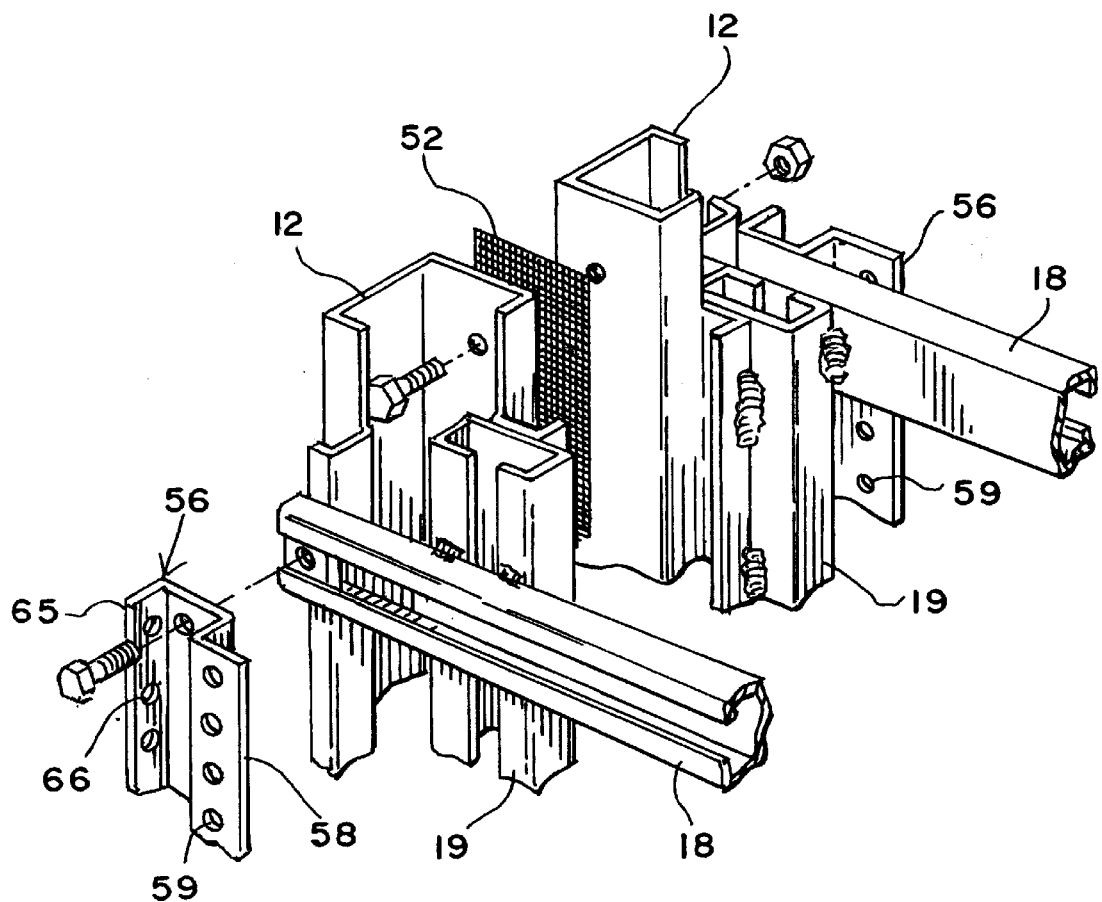
FIG. 4 is a perspective exploded view of an upper corner illustrating the uni-struts and the mounting channel in combination with the uni-struts.

The uni-strut mounting on the outside portions of the two outside enclosures are basically shown in FIG. 8 of U.S. Pat. No. 5,639,150. As shown in FIG. 4, however, each of the main channels 12, in addition to having uni-struts secured to it both horizontally and vertically, has an external mounting channel 56 with a mounting flange 58. The mounting flange 58, in turn, contains a plurality of spaced holes 59 running vertically on the mounting flange 58. The outer flange 65 of the mounting channel 56 similarly has a plurality of holes 66 for mounting exteriorly. As shown in perspective, the gutter RFI cords 54 are positioned in all of the gutter where there is a mating part. Similarly, as shown in the upper portion of FIG. 4, the RFI mesh 52 is positioned between the two adjacent faces of the main channels 12.

The method of the invention relates to the securement in adjacent fashion of the enclosures 10 and their respective frames 11. Important to the securement is the utilization of a single uniform top member 26 with a plurality of depending bolts 28 for securing the same along the entire assembly of enclosures 10. Adjacent panels are secured by means of main channels 12 which do not have a chamfered corner. Alternatively, the end panels do have a chamfer 15 at the corner, particularly as shown in FIG. 1. Optionally, the rear corners of the main channels 12 may or may not utilize the chamfer 15.

What is claimed is:

1. An electronic component enclosure having a frame comprising a plurality of enclosures, each of said enclosures has an enclosure frame and respective closure panels, said enclosure frame having a main channel corner member forming to have an outer face and a side face, wherein each of said faces joins the other face to define an outer corner of a main channel;

said main channel having reversely folded lateral edges at remote edges of the outer face and the side face to form a J-shaped channel;

whereby a plurality of said main channels are secured by top cross ties and bottom cross ties, wherein each of said cross ties has a reversely folded J-shaped lateral edge complementary to that of the main channel;

each of said enclosures abutting face to face with another of said enclosures at an essentially right angle corner, wherein the outer faces and side faces intersect;

said enclosures having an outer end portion without an adjacent enclosure, terminating the two faces of the main channel member with a chamfer which is at an angle with each of the two faces;

a plurality of front and rear cross ties, each of said cross ties has a lateral edge with a reversely folded J-shaped portion defining a gutter;

whereby after all of the enclosures are secured to each other, a frame is provided on each side; and front and rear portions having J-shaped gutters for receiving panels with an RFI shielding material in the gutters for surrounding the enclosures.

2. The enclosure according to claim 1, further comprising:

a plurality of horizontal uni-strut members fixedly secured to an interior face of the main channel;

whereby said horizontal uni-strut members are secured to a vertical uni-strut member.

3. The enclosure according to claim 2, further comprising:

a horizontal support positioned on left and right sides of each of said enclosures for receiving and supporting electronic components.

4. The electronic enclosure according to claim 1, further comprising:

vertical mounting flanges secured to horizontal uni-struts for mounting interior and exterior members.

* * * * *